Dec. 24, 1968    G. I. THOMAS    3,417,502
HEAVY LOAD FISHING DEVICE
Filed May 16, 1966

INVENTOR
GERALD I. THOMAS
BY
Wynne + Finken

United States Patent Office 3,417,502
Patented Dec. 24, 1968

3,417,502
HEAVY LOAD FISHING DEVICE
Gerald I. Thomas, P.O. Box 3577,
Panama City, Fla. 32404
Filed May 16, 1966, Ser. No. 550,411
4 Claims. (Cl. 43—27.4)

ABSTRACT OF THE DISCLOSURE

A fishing device whch has an upright reel spool secured to a support, a resilient arcuate arm extending from the support, and a main pulley mounted on the outer free end of the arm and spaced from the spool to enable unwinding of fish line therefrom without rotation of the spool. An auxiliary pulley is provided for selective use in winding line back onto the spool.

---

This invention relates to a commercial-type fishing device for catching weighty and large hauls of fish. The device is particularly designed for use by commercial fishermen in great water depths as well as shallow water depths.

The fishing device of the instant invention provides the free line pay-out advantages of spinning reels in combination with a winding system which facilitates the rapid raising and boating of heavy hauls of fish from great depths. Commercial fishing rigs in use today do not provide these advantages. For example, U.S. Patent No. 2,792,658 to J. J. Stafford shows a commercial fishing rig which does not provide a spinning capability in combination with the required powerful equipment for catching and hauling large catches.

The commercial-type fishing device of the instant invention includes a support member having an upright reel supporting portion which is adapted for rigid attachment to a foundation such as a boat, barge, fishing platform or the like. This arrangement provides the basic structure required for raising the heavy loads. Extending substantially horizontally outwardly from this rigid base structure is an elongated resilient arm preferably of the flat spring type formed into an arcuate member such that its outer free end portion is in substantial horizontal alignment with the axis of a reel mounted on the base structure. A main pulley is mounted on the outer end of the arm and fishing line can be spun off from the reel through the main pulley, the axis of the reel extending horizontally in a direction substantially toward the free end portion of the arm to facilitate the spinning of the line. This arrangement expedites the fishing operation and when a load has been hooked, the line between the spool of the reel and the main pulley is passed over the open end of an auxiliary pulley which aligns the line for winding on the spool, the auxiliary pulley being mounted vertically transversely outwardly of the periphery of the large diameter flat spool of the reel. Not only does this intermediate auxiliary pulley enable the reeling-in action of the spool, but it also provides control for the line through the reel during trolling or other fishing operations.

Figure 1:
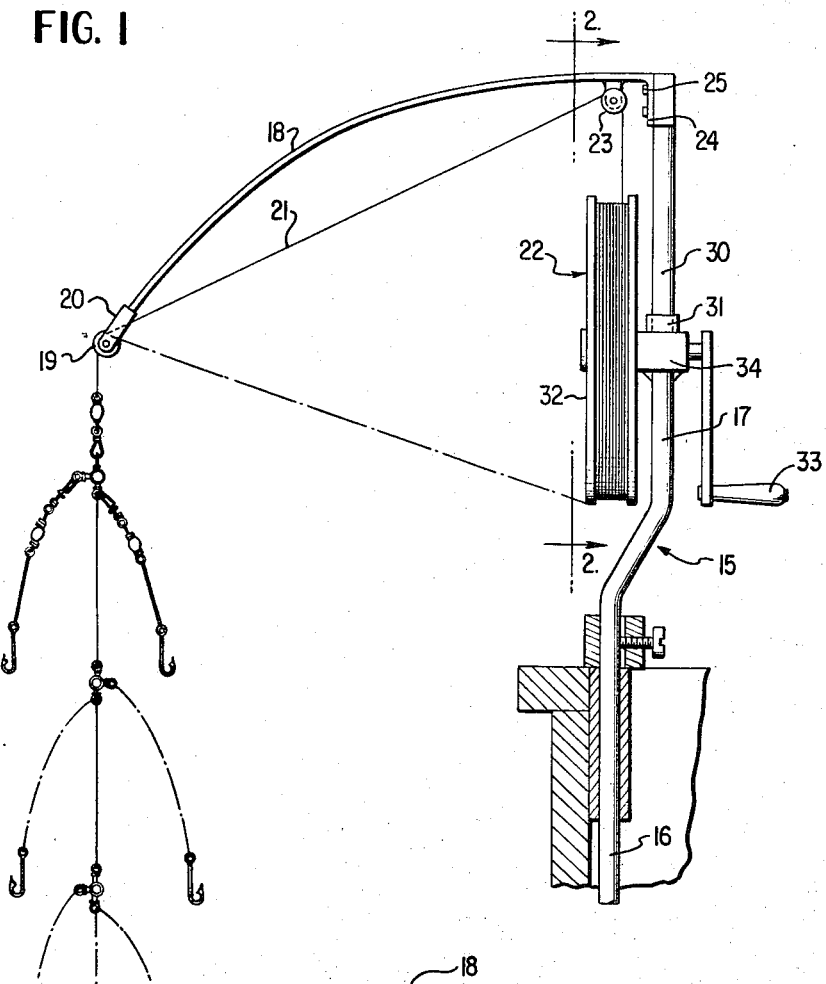
Figure 2:
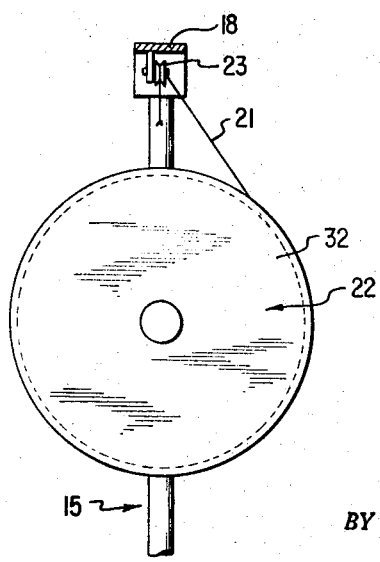

These and further objects and advantages of the present invention will become more apparent upon reference to the following specification, appended claims and drawings wherein:

FIG. 1 is a side view of the fishing device; and
FIG. 2 is a view taken on line 2—2 of FIG. 1.

Referring now to the drawing, it will be seen that the fishing device includes a support member 15 which is rigidly mounted on a fishing boat in any suitable manner through its bottom mounting leg 16. The support member 15 includes the upright reel supporting portion 17 and the elongated resilient arm 18 which extends outwardly therefrom in a substantially arcuate horizontal fashion.

A main pulley 19 is rotatably mounted at the outer free end 20 of the arm 18, the main pulley having both ends closed to hold the line 21 captive.

A reel 22 is suitably rotatably mounted in cantilever fashion on the reel supporting portion 17 with its axis of rotation extending horizontally in a direction substantially toward the free end portion of the arm so that when the line 21 freely feeds out from the reel 22 as shown in dotted lines through the main pulley 19, it spins off the open end of the reel 22 without requiring unwinding rotation of the reel.

An auxiliary pulley 23 is mounted in cantilever fashion on the support member 15 for guiding line 21 from the main pulley 19 into winding alignment with the spool 32 for enabling control of the line as well as for winding the line, the auxiliary pulley being mounted transversely outwardly of the periphery of the large diameter flat spool 32.

Preferably the resilient arm 18 is in the form of a flat leaf spring with its flat surfaces horizontally disposed and with its outer free end 20 positioned substantially in horizontal alignment with the central axis of the reel 22, the auxiliary pulley 23 being mounted in depending fashion from the inner end of the arm 18. A base 24 is formed at the inner end of the spring 18 by bending the spring downwardly, this base 24 then being bolted to the top end of the reel supporting portion 17 by connecting means 25.

The auxiliary pulley 23 is preferably mounted in vertical alignment with spool 32 and above and offset inwardly from the main pulley 19, the axis of the auxiliary pulley 23 being parallel to the axis of the main pulley 19 and at right angles to the axis of the reel 22.

Preferably the reel supporting portion 17 includes a top bar 30 which is threadedly mounted at the top of the bearing 31 of the reel enabling a disconnection for compact storage.

The reel 22 may be of standard design for heavy duty uses of the type shown in U.S. Patent No. 2,792,658 and includes a spool 32 having an outside diameter of about 1 foot and a crank handle 33 of about ½ foot length for turning the spool. Suitable clutch and brake means for the reel 22 are indicated by element 34.

In use, the multiple hook weighted line 21 is removed from the open end of the auxiliary pulley 23, the line then feeding from the reel 22 without rotation thereof. When it is desired to play a large fish, the line can be returned to guided engagement with the auxiliary pulley 23 thereby providing control of the line through the reel 22. When it is desired to reel the line in, the line is also placed over the auxiliary pulley.

The auxiliary pulley 23 is shown in FIGS. 1 and 2 as being vertically aligned with spool 32; it will be understood that the pulley 23 can under some circumstances be mounted in an angular position relative to spool 32 or on a swivel connection where line handling conditions require a more in-line arrangement with the spool 32.

I claim:
1. A commercial-type fishing device comprising a support member having an upright reel supporting portion adapted for rigid attachment to a boat and an elongated resilient arm attached to said reel supporting portion extending substantially horizontally and arcuately outwardly from said reel supporting portion, a main pulley mounted on said arm at the outer free end portion thereof, an auxiliary pulley mounted on said resilient arm adjacent its attached end, a reel including a large diameter flat spool rotatably mounted in cantilever fashion on said reel supporting portion of said support member with its axis of rotation extending horizontally in a direction substantially toward the free end portion of said arm to enable the unwinding of fish line from the open end of the spool and through the main pulley without rotation of the spool, said auxiliary pulley being mounted on said arm in cantilever fashion transversely outwardly of the periphery of said flat spool for guiding fish line into winding alignment with the spool when the line is placed thereon.

2. A fishing device as defined in claim 1 and wherein said spool has an outside diameter of about 1 foot.

3. A fishing device as defined in claim 1 and wherein said arm is a flat leaf spring having a base at one end attached to said reel supporting portion.

4. A fishing device as defined in claim 3 and wherein said auxiliary pulley is mounted vertically above said spool.

References Cited

UNITED STATES PATENTS

| | | | |
|---|---|---|---|
| 952,812 | 3/1910 | Jorgensen | 43—21.2 |
| 2,792,658 | 5/1957 | Stafford | 43—4 |

SAMUEL KOREN, *Primary Examiner.*

D. J. LEACH, *Assistant Examiner.*

U.S. Cl. X.R.

43—21.2, 6.5